(12) United States Patent
Mears et al.

(10) Patent No.: US 8,871,355 B1
(45) Date of Patent: Oct. 28, 2014

(54) MICROSTRUCTURE ENHANCED SINTER BONDING OF METAL INJECTION MOLDED PART TO A SUPPORT SUBSTRATE

(75) Inventors: Laine Mears, Anderson, SC (US);
Thomas Martens, Greenville, SC (US)

(73) Assignee: Clemson University, Clemson, SC (US)

( * ) Notice: Subject to any disclaimer, the term of this patent is extended or adjusted under 35 U.S.C. 154(b) by 226 days.

(21) Appl. No.: 13/269,940

(22) Filed: Oct. 10, 2011

Related U.S. Application Data

(60) Provisional application No. 61/391,190, filed on Oct. 8, 2010.

(51) Int. Cl.
 B32B 3/30 (2006.01)
 B32B 7/00 (2006.01)
 B32B 15/16 (2006.01)
 B22F 7/04 (2006.01)

(52) U.S. Cl.
 USPC .................. 428/553; 428/594; 419/8; 419/38

(58) Field of Classification Search
 None
 See application file for complete search history.

(56) References Cited

U.S. PATENT DOCUMENTS

| | | | |
|---|---|---|---|
| 3,128,419 A * | 4/1964 | Schering et al. | 257/746 |
| 3,716,347 A | 2/1973 | Bergstrom et al. | |
| 4,338,380 A * | 7/1982 | Erickson et al. | 428/594 |
| 4,489,033 A | 12/1984 | Uda et al. | |
| 4,515,543 A | 5/1985 | Hamner | |
| 4,556,532 A | 12/1985 | Umeha et al. | |
| 4,595,637 A * | 6/1986 | Eaton et al. | 428/608 |
| 4,734,237 A | 3/1988 | Fanelli et al. | |
| 4,875,616 A * | 10/1989 | Nixdorf | 228/120 |
| 5,258,155 A | 11/1993 | Sekido et al. | |
| 5,332,537 A | 7/1994 | Hens et al. | |
| 5,495,978 A * | 3/1996 | Muth | 228/122.1 |
| 5,554,338 A | 9/1996 | Sugihara et al. | |
| 5,759,753 A * | 6/1998 | Namba et al. | 438/456 |
| 5,985,208 A | 11/1999 | Zedalis et al. | |
| 6,090,320 A | 7/2000 | Grundner et al. | |

(Continued)

FOREIGN PATENT DOCUMENTS

| | | | |
|---|---|---|---|
| DE | 102010061958 | * | 5/2012 |
| JP | 2-30678 | * | 2/1990 |
| JP | 2000-269391 | * | 9/2000 |

OTHER PUBLICATIONS

Asaka, K. Diffusion Bonding methods of Green Compacts with Wrought Steel Parts During Sintering. in 2000 *Advances in Powder Metallurgy & Particulate* Materials, 2000, New York, N.Y.

(Continued)

*Primary Examiner* — John J Zimmerman
(74) *Attorney, Agent, or Firm* — Dority & Manning, P.A.

(57) ABSTRACT

Composites that include a metal injection molded component bonded to a support substrate and methods for forming the composites are described. Methods include forming a metal injection molded green part that includes microstructures on a surface of the green part. The metal injection molded component is located adjacent to a support substrate with the microstructure ends contacting the support substrate at a contact surface. During sintering the metal injection molded component is bonded to the support substrate at the ends of the microstructures. The presence of the microstructures can allow for relative motion between the metal injection molded component and the support substrate during sintering. The large bonding surface area provided by the multiple points of contact between the ends of the microstructures and the support substrate can provide excellent bonding force between the metal injection molded component and the support substrate.

20 Claims, 4 Drawing Sheets

(56) References Cited

U.S. PATENT DOCUMENTS

| | | | |
|---|---|---|---|
| 6,248,281 B1 | 6/2001 | Abe et al. | |
| 6,280,584 B1* | 8/2001 | Kumar et al. | 204/298.15 |
| 6,551,551 B1 | 4/2003 | Gegel et al. | |
| 6,995,336 B2 | 2/2006 | Hunt et al. | |
| 7,374,864 B2 | 5/2008 | Guo et al. | |
| 2004/0009365 A1* | 1/2004 | Fried et al. | 428/614 |
| 2005/0147839 A1* | 7/2005 | Suwa et al. | 428/624 |
| 2007/0202000 A1* | 8/2007 | Andrees et al. | 419/5 |
| 2010/0314072 A1* | 12/2010 | Lee et al. | 165/80.2 |
| 2012/0225989 A1* | 9/2012 | Broadley et al. | 524/439 |
| 2012/0301743 A1* | 11/2012 | Walker et al. | 428/608 |
| 2013/0156626 A1* | 6/2013 | Roth-Fagaraseanu et al. | 419/6 |
| 2013/0259732 A1* | 10/2013 | Schult et al. | 419/6 |

OTHER PUBLICATIONS

Baumgartner, R. and L.-K. Tan, MIM 'marries' metals. *Metal Powder Report*, 2002, 57(3): p. 38-42.

Blaine, D.C., et al., Application of work-of-sintering concepts in powder metals. Metallurgical and Materials Transactions A: Physical Metallurgy and Materials Science, 2006. 37(9): p. 2827-2835.

Blaine, D.C., Garg, P. & German, R. Master Sintering Curve for a Two-Phase Material; *4th International Conference on Science Technology and Applications of Sintering*; 2005.

Blaine, D.C., S.-J. Park, and R.M. German. Linearization of master sintering curve. 2009, 350 Main Street, Malden, MA 02148, United States: Blackwell Publishing Inc.

Braginsky, M., V. Tikare, and E. Olevsky. Numerical simulation of solid state sintering, 2005: Elsevier Ltd.

Damlinger, H. and C. Gierl, Processes in PM steel compacts during the initial stages of sintering. *Materials Chemistry and Physics*, 2001. 67(1-3): p. 49-55.

Frenkel, Y.I., Viscous flow of crystalline bodies under the action of surface tension; *Science of Sintering*, 1980. 12(1): p. 7-18.

Genkichi Umeha, S.U., Saturo Kato, Method for Manufacturing Camshaft, U.S.P. Office, Editor. 1985, Nippon Piston Ring Co., Ltd., Tokyo, Japan: USA. p. 5.

German, R.M. and J.F. Lathrop, Simulation of spherical powder sintering by surface diffusion, *Journal of Materials Science*, 1978. 13(5): p. 921-9.

German, R.M., Computer modeling of sintering processes. *International Journal of Powder Metallurgy* (Princeton, New Jersey), 2002. 38(2): p. 48-66.

German, R.M., Injection Molding of Metals and Ceramics. 1997, Princeton, NJ: *Metal Powder Industries Federation*. p. 83; p. 200.

German, R.M., Sintering Theory and Practice. I ed. 1996, New York, NY: John Wiley & Sons, Inc. p. 7; p. 96; p. 190; p. 453.

Green, D.J., 0. Guillan, and J. Rode], Constrained sintering: A delicate balance of scales. *Journal of the European Ceramic Society*, 2008. 28(7): p. 1451-1466.

Harikou, T., et al., Joining of stainless steels (SUS316L) and hard materials by insert injection molding. Funtai Oyobi Fummatsu Yakin; *Journal of the Japan Society of Powder and Powder Metallurgy*, 2004, 51(1): p. 31-36.

Heaney, D.F. and R. Spina, Numerical analysis of debinding and sintering of MIM parts, *Journal of Materials Processing Technology*, 2007. 191(1-3): p. 385-389.

Hunghai, S. and D.L. Johnson, Master sintering curve: a practical approach to sintering; *Journal of the American Ceramic Society*, 1996. 79(12): p. 3211-17.

Imgrund, P., A. Rota, and M. Wiegmann, Getting better bonding at tiny intelfaces, *Metal Powder Report*, 2007. 62(3): p. 31-34.

Kiani, S., J. Pan, and J.A. Yeomans, A New Scheme of Finding the Master Sintering Curve. *Journal of the American Ceramic Society*, 2006. 89(11): p. 3393-3396,.

Kraft, T. and H. Riedel, Numerical simulation of solid state sintering; model and application. Journal of the European Ceramic Society, 2004. 24(2): p. 345-361.

Leclerc, H. and J.C. Gelin. Numerical modeling of solid state sintering using heterogeneous packing and diffusion processes. 2003. Switzerland: Elsevier.

Miura, H., et al., Joining for more functional and complicated parts in MIM process, Funtai Oyobi Fummatsu Yakin, *Journal of the Japan Society of Powder and Powder Metallurgy*, 1997. 44(5): p. 437-442.

Miura, H., T. Yano, and M. Matsuda, MIM In-process joining of thin and hollow parts Funtai Oyobi Fummatsu Yakin, *Journal of the Japan Society of Powder and Powder, Metallurgy*, 2001. 48(11): p. 1097-1101.

Olevsky, E.A., Theory of sintering from discrete to continuum; *Materials Science & Engineering R: Reports*, 1998. 23(2): p. 41-99.

Park, S.J., et al. Master sintering curve formulated from constitutive models. 2009, 350 Main Street, Malden, MA 02148, United States: Blackwell Publishing Inc.

Reiterer, M.W. and K.G. Ewsuk, An Analysis of Four Different Approaches to Predict and Control Sintering; *Journal of the American Ceramic Society*, 2009. 92(7): p. 1419-1427.

Reiterer, M.W., K.G. Ewsuk, and J.G. Arguello, An Arrhenius-type viscosity Junction to model sintering using the Skorohod-Olevsky viscous sintering model within a finite-element code. *Journal of the American Ceramic Society*, 2006. 89(6): p. 1930-5.

Riedel, H., H. Zipse, and J. Svoboda, Equilibrium pore surfaces, sintering stresses and constitutive equations for the intermediate and late stages of sintering—II. Diffusional densification and creep. *Acta Metallurgica et Materialia*, 1994. 42(2): p. 445-452.

Ristic, M.M., Frenkel's Theory of Sintering; *Science of Sintering*, 1996. 28(Special Issue): p. 1-1.

Schatt, W., Sintervorgange. 1992, Dusseldorf: VDI-Verlag GmbH. p. 77 ff.

Tabata, T. and S. Masaki. How to Produce PIM Composite Parts From Metal Powder and Solid Metal by Sinter Bonding. 1985. Toronto, Ont, Can: *Metal Powder industries Federation*.

Tabata, T., et al., Fabrication of composite parts by sinter bonding. International *Journal of Powder Metallurgy* (Princeton, New Jersey), 1991. 27(3): p. 265-273.

Tikare, V., M. Braginsky, and E.A. Olevsky, Numerical simulation of solid-state sintering. I. Sintering of three particles. *Journal of the American Ceramic Society*, 2003; 86(1): p. 49-53.

Wakai, F., Modeling and Simulation of Elementary Processes in Ideal Sintering. Journal of the American Ceramic Society, 2006. 89(5): p. 1471-1484.

Wang, Y.U., Computer modeling and simulation of solid-state sintering: A phase field approach . . . *Acta Metallurgica et Materialla et*, 2006. 54(4): p. 953-961.

Young-Sarn, K., et al., Simulation of the sintering densification and shrinkage behavior of powder-injection-molded 17-4 PH stainless steel. Metallurgical and Materials Transactions A (Physical Metallurgy and Materials Science), 2004. 35A(1): p. 257-63.

Zhang, S.X., et al., Sinter bonding sticks MIM ahead again; *Metal Powder Report*, 2003, 58(12): p. 20-23.

* cited by examiner

MICROSTRUCTURE ENHANCED SINTER BONDING OF METAL INJECTION MOLDED PART TO A SUPPORT SUBSTRATE

CROSS REFERENCE TO RELATED APPLICATIONS

This application claims filing benefit of previously filed U.S. Provisional Patent Application Ser. No. 61/391,190 having a filing date of Oct. 8, 2010, incorporated herein by reference in its entirety.

BACKGROUND

Metal injection molding is a well established process that has been used since the 1980's to create small, complex metal parts in high volumes for use in a variety of industries and applications. The metal injection molding process is typically described as a powder metallurgy process where the compaction stage is achieved through injection molding. In metal injection molding, fine metal powders are mixed with a polymeric or water based binder and this metal powder composition is injected into a mold to form a green part. The binder is a temporary vehicle for homogeneously packing the metal powder into the desired shape and holding the metal in the desired shape until the beginning of sintering. After molding, the binder is removed from the green part in a debinding process, and the brown part thus formed is sintered. FIG. 1 illustrates a typical process as is generally known in the art. Metal injection molding has proven beneficial in formation of metal parts of complex shape, particularly in high volume production processes.

Unfortunately, there are size and shape limitations in forming parts according to a metal injection molding process. These limitations are mainly imposed by the debinding and sintering processes. For instance, thick cross sections are difficult to debind and/or take too much time to debind, making this process step too cost intensive for formation of structures that include a thick cross section. In addition, unsupported areas of larger parts can deform during sintering due to the effects of gravity.

Such limitations could be overcome by joining the nascent metal injection molded part with a support substrate and thereby creating a composite. Formation of a composite could provide additional advantages as well. For instance, the amount of metal powder used could be reduced; parts that are presently difficult to make by metal injection molding due to, e.g., mold design, cost or size could be more easily fabricated; high mechanical strength or other properties could be acquired at desirable levels through combinations of different materials, for example an alloy steel feedstock powder could be combined with comparatively cheap steel support substrate; and multiple properties such as both magnetic and non-magnetic characteristics could be developed in a single composite. Such improvements could also lead to cost reductions in a formation process.

Attempts have been made to form metal injection molding composites. For instance, composites have been formed by bringing a metal powder composition and a support substrate into close contact by pressing the metal powder composition to the support substrate, for example by pressing the metal powder composition around a solid cylinder, inside a tube, or onto a flat strip. Unfortunately, the bonded joint of such composites can be weakened by the relative shrinkage of the metal powder portion in comparison with the substrate. There has also been work carried out in which green parts are bonded to one another, either by assembling previously formed green parts or by injecting multiple metal powder compositions simultaneously or successively directly onto each other. Another method of manufacturing composites involves separately metal injection molding several components of an assembly. Some of the components are then machined to exact dimensions and pre-sintered and then the composite is completed by shrink-fit or adhesive bonding of the several components to one another.

While the above describes improvement in the art, further room for improvement exists. For instance, what are needed in the art are metal injection molding composites in which a metal injection molded component is strongly adhered to a support substrate. What are also needed in the art are methods for forming metal injection molding composites that can be carried out in a high throughput system and according to an economically advantageous process.

SUMMARY

According to one embodiment, disclosed is a method for forming a metal injection molded composite. For instance, a method can include metal injection molding a metal powder composition to form a metal injection molded component. The metal injection molded component can include a plurality of microstructures (also referred to as microfeatures herein) on a surface. The method can also include locating the metal injection molded component adjacent to a support substrate such that the distal ends of the microstructures contact a surface of the support substrate. The method also includes sintering the metal injection molded component. Upon sintering, a sinter bond can be formed between the tops of the microstructures and the surface of the support substrate. This bond can be maintained through the relative shrinkage during sintering of the powdered metal component by deformation of the microfeatures rather than weakening of the bond.

Also disclosed is a metal injection molded composite. A composite can include a metal injection molded component, a support substrate, and a plurality of microstructures that extend between the metal injection molded component and the support substrate. More specifically, the microstructures are extensions of the metal injection molded component and are sinter bonded to the support substrate.

BRIEF DESCRIPTION OF THE FIGURES

A full and enabling description of the presently disclosed subject matter, including the best mode thereof, to one of ordinary skill in the art, is set forth more particularly in the remainder of the specification, including reference to the accompanying Figures, in which.

DETAILED DESCRIPTION

Figure 1:
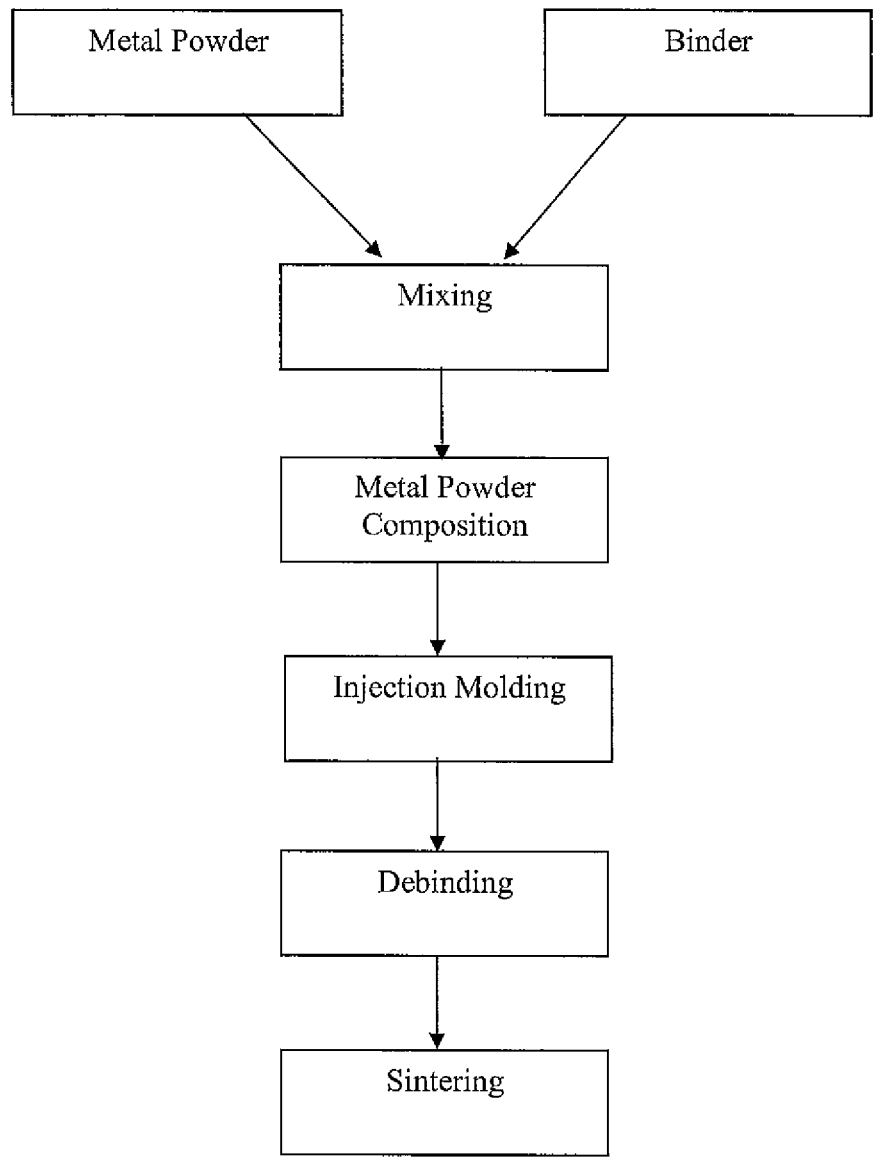
FIG. 1 illustrates a typical metal injection molding process as is known in the art.

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made to the disclosed subject matter without departing from the scope or spirit of the disclosure. For instance, features illustrated or described as part of one embodiment, may be used with another embodiment to yield a still further embodiment.

In general, disclosed herein are composites that include a metal injection molded component adhered to a support substrate and methods for forming the composites. More specifically, disclosed methods include forming a metal injection molded green part that includes microstructures on a surface of the green part. The metal injection molded component including microstructures can then be aligned with a support substrate at a contact surface and sintering can be carried out during which the metal injection molded component is bonded to the support substrate by the formation of sinter bonds between the microstructures and the surface of the support substrate. The presence of the microstructures can allow for relative motion due to bulk shrinkage between the metal injection molded component and the support substrate during sintering. More specifically, the presence of the microstructures can allow for irregular relative motion between the metal injection molded component and the support substrate over the binding area surface, which can prevent pore formation and weakening of the bonded areas. In addition, the large bonding surface area provided by the multiple points of contact between the distal ends of the microstructures and the support substrate can provide excellent bonding strength between the metal injection molded component and the support substrate.

In developing the methods and composites described herein, typical direct injection of a metal powder composition onto a support substrate followed by debinding and sintering, with no microstructures formed on the metal injection molded component, was initially carried out. This process led to deformation of the metal injection molded component, with the only adherence points between the two components occurring at the meeting edges. Moreover, when metal injection molding was carried out on a very flat substrate, there was often no adherence at all between the two components. Other problems with direct injection molding onto a support substrate included cracking of one or more of the components during sintering and relative motion between the two components during sintering.

In an attempt to avoid such problems, support substrates were formed that included surface features such as slots cut into the surface to allow for a mechanical interlock between the metal injection molded component and the support substrate. While such methods were found to provide more bonding areas between the two components and avoid larger deformations as described above, there were still large areas between the two components where no bonding took place as well as deformation and pore formation in the metal injection molded component due to shrinkage of the metal injection molded component during and following bonding to the support substrate. Likewise, the formation of small perpendicular grooves (0.3 mm) in the surface of the support substrate led to the formation of cracks and pores in the metal injection molded component. Specifically, the metal powder was found to have bonded to the substrate on top of some grooves, filled others and left many open pores.

During debinding, the binder is removed from the green part, leaving an open pore structure in the metal injection molded component. After debinding and prior to sintering, a metal injection molded brown component can be up to about 60% dense, meaning that up to about 40% of the volume can be open porosity. During sintering, the pores are reduced, ideally to a minimum, and the metal injection molded component is sintered to near full density.

During debinding and sintering of a composite, there can be a series of volumetric changes in both the metal injection molded component and the support substrate component. While the components are heated during thermal debinding, pre-sintering and final sintering, the support substrate can continuously expand due to thermal expansion. The metal injection molded component, on the other hand, will expand at the beginning of the process due to thermal expansion, but as the process continues, the metal injection molded component will contract due to fusion of the metal particles, increasing density. The metal injection molded component and the support substrate thus experience motion relative to one another. As the two components are sinter bonded to one another, the relative motion of the two components is constrained due to bond formation. As a result, continued densification of the metal powders of the metal injection molded component and the resultant continued shrinkage of the metal injection molded component can lead to the formation of pores and cracks in the metal injection molded component. Following sintering, when the metal injection molded component has reached its final density, the composite is cooled down and shrinks due to thermal shrinkage. In addition, depending on the materials and sintering atmospheres, there can be phase changes during heating and cooling, which can result in unequal volumetric changes of the metal injection molded component and the support substrate, leading to further stresses on the bonded components that are now physically constrained from relative motion.

According to the present disclosure, to avoid pores and cracks from forming during formation of a composite, a green part that includes microstructures on a surface of the metal injection molded component can be formed. The microstructures can be formed on a surface that will overlap a support substrate for bonding between the two components. More specifically, distal ends (e.g., top surfaces, the portion of the microstructures that are distal to the bulk of the metal injection molded component) of the microstructures can contact the surface of the support substrate such that a plurality of sinter bonds can be formed between the metal injection molded component and the support substrate, each sinter bond being at where the end of a microstructure meets the surface of the support substrate. The microstructures can deform due to their size and shape and can allow for relative motion between the support substrate and the metal injection molded component during sintering and cooling without fracture of the bonded area.

The microstructures can be circular or non-circular in cross-section. For example, the cross-section of a microstructure may be polygonal (e.g. star-shaped, square, triangular), oblong, or any other shape.

The size of individual microstructures may be optimized depending upon the specific materials utilized in the composite, the strength requirements of the composite, etc. For instance, the average cross-sectional dimension of a microstructure may be between about 1 micrometer (µm) and 1 mm, or between about 5 µm and about 500 µm, or between about 10 µm and about 200 µm. The end of a microstructure can be flat or rounded. For instance, the end of a microstructure may have a radius that is up to about the equivalent radius of the microfeature cross-section.

The height of a microstructure can generally be between about 10 μm and about 1 mm, for instance about 500 μm or less, or between about 10 μm and about 500 μm, or between about 25 μm and abut 200 μm.

The plurality of microstructures on a surface of the metal injection molded component can be located on the surface in any random or organized pattern. For example, the microstructures may be spaced apart in a uniform manner, such as in a rectangular or square grid or in concentric circles. The spacing may depend on numerous factors, including height and width of the microstructures, as well as the materials used in formation of the metal injection molded component. For example, in one embodiment the microstructures can have a pitch, i.e., a "tip-to-tip" spacing between microstructures of less than about 800 μm, for instance from about 10 μm to about 800 μm, in some embodiments from about 20 μm to about 500 μm, and in some embodiments, from about 30 μm to about 200 μm.

Figure 2:
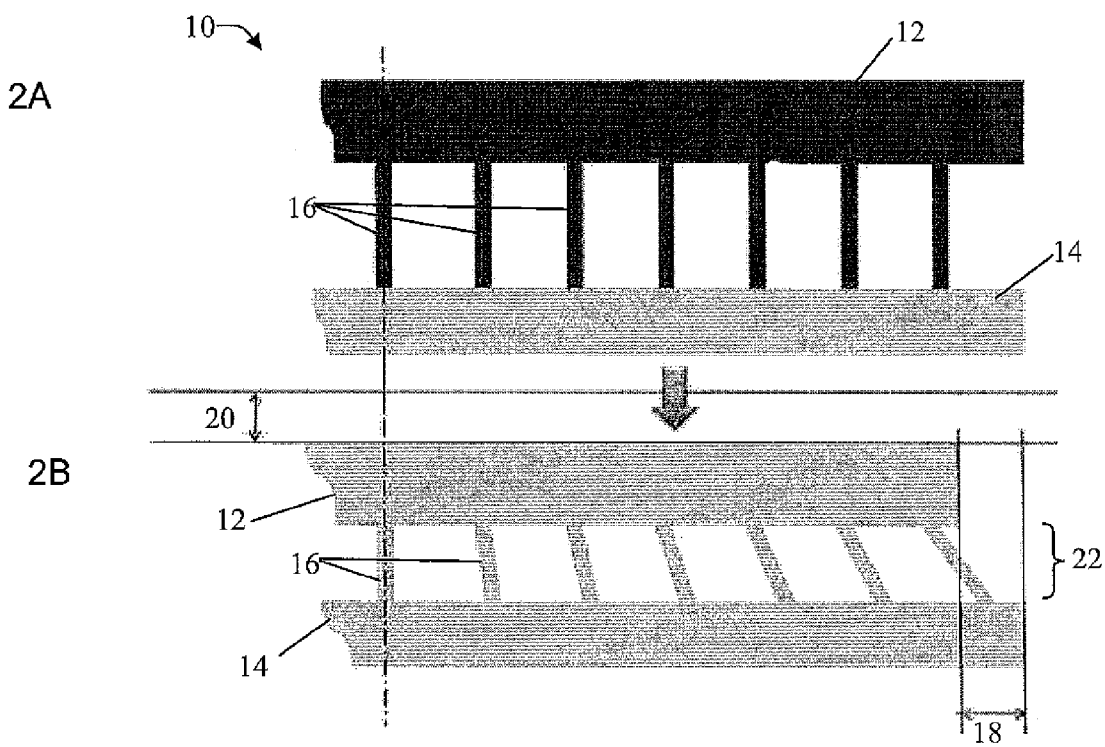
FIG. 2 illustrates a composite including a metal injection molded component and a support substrate before (FIG. 2A) and following (FIG. 2B) sintering.

FIG. 2 illustrates a portion of a composite 10 that includes a metal injection molded component 12 and a support substrate 14 before (FIG. 2A) and following (FIG. 2B) debinding and sintering. The metal injection molded component 12 includes a series of microstructures 16 on the surface. The microstructures 16 can allow for relative motion between the metal injection molded component 12 and the support substrate 14 during debinding and sintering during which the metal injection molded component 12 can shrink and densify. Moreover, relative motion can take place between the metal injection molded component 12 and the support substrate even after initial bonding has begun at the contact area between the microstructures 16 and the support substrate 14. The inclusion of the microstructures 16 on the metal injection molded component 12 imparts elasticity to the composite, particularly during the initial sintering stages, when the metal injection molded component 12 can have a high shrinkage rate and the support substrate 14 can be expanding due to thermal expansion. Overall, the composite 10 can decrease in size due to shrinkage of the metal injection molded component 12 as illustrated by the shrinkage dimensions 18, 20 in the horizontal and vertical directions as illustrated in FIG. 2B.

The inclusion of the microstructures 16 in the composite 10 can also provide a gap 22 between the metal injection molded component 12 and the support substrate 14 that can allow for a more uniform temperature distribution over the binding area surface during sintering. This can encourage closer to simultaneous bonding between individual microstructures 16 and the surface of the support substrate 14. While not wishing to be bound to any particular theory, it is believed that simultaneous bonding or bonding close to simultaneous between the ends of the individual microstructures 16 and the support substrate 14 can prevent deformation of both the metal injection molded component 12 and the support substrate 14 of the composite 10.

The metal injection molded component 12 can be formed from a metal powder composition including metal powders mixed with a polymeric or water-based binder. Metals that can be used in forming the metal injection molded component 12 can include any metals as are generally known in the art for use in metal injection molding. For example, metals of the metal injection molded component can include, without limitation, steels such as 1020 steel, 4140 HT steel, iron nickel steel, Inconel® alloys, Hastelloy® alloys, stainless steel, and the like. Other metal powders can include, without limitation, titanium, tungsten, gold, copper, nickel, cobalt, alloys of any of these metals, and so forth. A metal powder can also include combinations of different metals and/or different metal alloys.

The metal powder generally includes equiaxed, rounded particles which are less than about 20 micrometers in average diameter, though the metal powder is not limited to any particular size or shape of metal particles. In one embodiment, the metal powder can have a large particle size distribution, which can provide a large content of small particles that have a high sintering activity, as is known in the art. However, this is not a requirement, and in other embodiments, the metal powder can have a narrow, more homogeneous particle size distribution.

The polymeric binder can include any suitable polymers. For example, a polymeric binder can include any polymer that is chemically compatible with the metallic powder and which allows the desired processing (e.g. mixing, injection, and debinding). Examples of polymers as may be included in a polymeric binder can include, without limitation, polyethylene, polypropylene, ethylene vinyl acetate, acrylics (e.g., polymethyl methacrylate, and polybutyl methacrylate), polystyrene, polychloroethene, polychlorovinylidene, polyamide, polyester, polyether, polyvinyl alcohol, copolymers of exemplary polymers, waxes, paraffins, fatty acids (such as, stearic acid), higher alcohols, fatty acid esters, fatty acid amides, and combinations thereof.

A polymeric binder can include additives in addition to one or more polymers as are generally known in the art. For instance, a polymeric binder can include a plasticizer. Examples of suitable plasticizers can include, without limitation, phthalate (such as, dioctyl phthalate, diethyl phthalate, dibutyl phthalate), adipate, trimellitic, and sebacate, or combinations of plasticizers.

Other additives as may be included in a polymeric binder can include, e.g., one or more of a lubricant, an oxidation inhibitor, a debinding accelerator, a surfactant, and the like.

Aqueous binder systems of the type described in U.S. Pat. No. 5,332,537 to Hens, et al., and agar-based binders as described in U.S. Pat. No. 4,734,237 to Fanelli, et al., U.S. Pat. No. 5,985,208 to Zedalis, et al., and U.S. Pat. No. 5,258,155 to Sekido, et al., all of which are incorporated herein by reference, are also suitable.

The polymeric binder can be pelletized for mixing with the metal powders of the composition. The particle diameter of a polymeric binder can be, for instance, from about 1 millimeter (mm) to about 10 mm.

The metal powder and the polymeric binder can be combined to form a metal powder composition. For example, the metal powder composition can include between about 50 wt. % and about 80 wt. % metal powder and between about 20 wt. % and about 50 wt. % polymeric binder. The metal powder and the polymeric binder can be thoroughly mixed according to standard practice as is generally known in the art. The mixing variables can vary depending upon the specific composition as well as the particle diameter of the metal powder, the specific composition and the relative proportion of the polymeric binder, as well as the make up of any additives included in the polymeric binder. By way of example, a metal powder and a polymeric binder can be mixed at a mixing temperature of from about 20° C. to about 200° C. for a mixing time of from about 20 minutes to about 240 minutes. Following mixing, a homogeneous scattering of the metal powder throughout the polymeric binder can be obtained such that the density of the green part can be uniform. As a result, a high quality metal sintered part without molding deficiency or sintering deficiency can be obtained.

Following mixing, the metal powder composition can be heated to a temperature above the melting temperature of the polymers of the polymeric binder, which can melt the polymeric binder and improve flow of the metal powder composition.

The metal powder composition can then be injection molded to form a green part that includes microstructures on a surface of the green part.

The metal injection molded component can be formed by use of a negative mold that includes a negative of the microstructures to be formed on a surface of the metal injection molded component. According to one embodiment, a positive mold master may be first formed, which corresponds to the desired shape of the formed microstructures, and then a negative mold may be formed from the positive mold master.

Any suitable material or combination thereof may be utilized in forming a negative mold and (when utilized) a positive mold master including, without limitation, metals such copper, steel, nickel, aluminum, brass, and other metals, as well as thermoplastic or thermoset polymers.

The negative of the microstructures may be formed on the surface of the mold or the positive microstructures may be formed on the surface of the positive mold master according to any suitable process. The microstructures may be formed on the entire metal injection molded component surface, or only on a portion thereof. In any case, the microstructures can be formed on a binding area surface that is intended to overlap a surface of a support substrate in formation of the composite and across which a series of sinter bonds can be formed between the ends of the microstructures and a surface of the support substrate.

A positive mold master and/or negative mold may be formed according to any standard microfabrication technique or combination thereof including, without limitation, lithography; etching techniques, such as wet chemical, dry, and photoresist removal; thermal oxidation of silicon; electroplating and electroless plating; diffusion processes, such as boron, phosphorus, arsenic, and antimony diffusion; ion implantation; film deposition, such as evaporation (filament, electron beam, flash, and shadowing and step coverage), sputtering, chemical vapor deposition (CVD), epitaxy (vapor phase, liquid phase, and molecular beam), electroplating, screen printing, lamination, stereolithography, laser machining, embossing molding, metal stamping, and laser ablation (including projection ablation); embossing; and micromachining processes.

An electrochemical etching process may be utilized in which electrochemical etching of solid silicon to porous silicon is used to create extremely fine silicon networks that may be used as positive mold master structures. This method may use electrolytic anodization of silicon in aqueous hydrofluoric acid, potentially in combination with light, to etch channels into the silicon. By varying the doping concentration of the silicon wafer to be etched, the electrolytic potential during etching, the incident light intensity, and the electrolyte concentration, control over the ultimate pore structure may be achieved. The material not etched (i.e. the silicon remaining) forms the microstructures on a positive mold master.

Plasma etching may also be utilized, in which deep plasma etching of silicon is carried out to create microstructures of a positive mold master with diameters on the order of 1 μm or larger. Microstructures may be fabricated indirectly by controlling the voltage (as in electrochemical etching).

Lithography techniques, including photolithography, e-beam lithography, X-ray lithography, ion beam etching and so forth may be utilized for primary pattern definition and formation of a negative mold or a positive mold master. Self-assembly technologies including phase-separated block copolymer, polymer demixing and colloidal lithography techniques may also be utilized in forming a negative mold or a positive mold master. A negative mold may be formed by laser ablation of a substrate (using, e.g., an excimer laser) to provide cavities in the shape of the desired microstructures.

Other methods as may be utilized in forming a positive mold master or a negative mold include utilization of ultra-high precision laser machining techniques, examples of which have been described by Hunt, et al. (U.S. Pat. No. 6,995,336) and Guo, et al. (U.S. Pat. No. 7,374,864), both of which are incorporated herein by reference.

In those embodiments in which a positive mold master is first formed, a negative mold can be formed by use of the positive mold master, for instance by casting or compression molding a metal or a polymer against the positive mold master, or according to any other method as is generally known in the art.

A known injection-molding apparatus may be utilized to extrude the metal powder composition into the cavity of a mold. The mold may optionally be heated to avoid excessively rapid solidification of the polymeric binder. In one embodiment, a batch injection molding procedure can be carried out in which the polymeric binder is melted in a discrete batch of the metal powder composition, and the discrete batch is then injection molded. In another embodiment, the metal powder composition can be molded in a continuous manner using known injection molding equipment capable of melting the polymeric binder as the metal powder composition passes through the screw. Once the metal powder composition has solidified, the mold is opened and the resulting green part is removed.

During an injection molding process the complete mold is heated, for instance to a temperature below the softening temperature of the binder to avoid distortion during demolding. For instance, the mold can be heated to a temperature of less than about 10° C. below the softening temperature of the polymeric binder. In one embodiment, the mold is heated to a temperature of less than about 20° C. below the softening temperature of the polymeric binder prior to injection of the metal powder composition.

As utilized herein, softening temperature refers to the temperature at which a polymeric material will soften and deform when subject to ordinary forces, such as those encountered during detachment of a green part from a mold segment. This may be conveniently measured by the Vicat softening temperature, which measures the temperature at which a flat-ended needle penetrates into a test sample of the polymeric binder (under conditions, for example, of a 50 N loading on the needle and a rate of temperature increase of 120° C./h as described in ASTM D1525-00). For amorphous materials, the softening temperature will be governed by the glass transition of the material, and in some instances the glass transition temperature will be essentially equivalent to the Vicat softening temperature. The glass transition temperature may be measured by methods known to one skilled in the art, such as by differential scanning calorimetry using a typical scanning rate of 10° C./min. For polymeric binders comprising both crystalline and amorphous polymers in which the bulk properties of the polymeric binder are governed by the crystalline polymer, the softening temperature is governed by the melting of the polymeric binder and may be characterized by Vicat softening temperature. Examples of such polymers include polypropylene, polybutylene terephthalate, polystyrene, polyethylene, polyetherimide, polyethylene terephthalate, and blends thereof.

The metal powder composition can be heated to a molding temperature in a chamber separate from the mold. The temperature to which the metal powder composition can be heated will generally depend on the specific materials of the composition. For instance, a metal powder composition may be heated to a temperature above the melting temperature of the polymeric binder such that the polymeric binder is molten according to standard practice.

Following heating, the metal powder composition is injected into the heated mold. The mold may be heated according to any known method, for instance by use of an oil heating system or electromagnetic induction heating that may be used to control the temperature of the microstructure voids in the mold.

During the molding process, the heated metal powder composition may flow to fill each successive microstructure negative mold cavity and thus fill the entire mold. The metal powder composition should not substantially cool before filling all of the mold cavities of the mold, since it may "skin over" or solidify and block further flow of the metal powder composition.

Following fill of the mold, the mold may be cooled prior to removal of the green part. For instance, the mold may be cooled to a temperature of less than about 5° C. below the softening temperature of the polymeric binder prior to separating the removing the green part. In another embodiment, the mold may be cooled to a temperature of less than about 10° C. below the softening temperature of the polymeric binder prior to demold.

In one embodiment, the injection of the metal powder composition may be carried out in conjunction with a packing or injection pressure used to aid in allowing the metal powder composition to fill the negative mold cavity. In one embodiment, this pressure may be greater than about 6,000 psi. In another embodiment, this pressure may be greater than about 10,000 psi. In yet another embodiment, this pressure may be greater than about 20,000 psi.

It may be desirable to add a compressive force to the metal powder composition in the mold in order to assist in filling the microstructures of the mold. By way of example, compressive force methods as may be utilized include those described in U.S. Pat. No. 4,489,033 to Uda, et al., U.S. Pat. No. 4,515,543 to Hamner, and U.S. Pat. No. 6,248,281 to Abe, et al., all of which are incorporated herein by reference.

A molding apparatus may include an overflow vent connected to the mold, as is generally known in the art. Metal powder composition including molten polymeric binder that is fed through the input line passes through the injection gate and into the mold cavity. As the metal powder composition fills the mold cavity it displaces air that was in the cavity and the displaced air may escape through the overflow vent. As such, little or no displaced air becomes trapped in pockets within the mold cavity. An overflow vent serves as an exit gate to allow displaced air to leave the cavity thus allowing for more uniform filling of the mold cavity with polymeric material. The overflow vent may be positioned anywhere on the outer surface of the mold.

The cycle time of a molding process, i.e., the amount of time between injection of the metal powder composition into the mold and detachment of the green part, is generally sufficient to allow the mold to be substantially filled with the metal powder composition and the polymeric binder of the composition to be subsequently cooled to a temperature below its softening point. The cycle time may be less than about 5 minutes, less than about 3 minutes, or less than about 90 seconds in one embodiment.

Following injection molding of the metal powder composition and formation of a green part, the polymeric binder can be removed according to a debinding process. Debinding is a delicate process step, since it is important that most or all binder is removed from the green part. On the other hand, a back-bone needs to be conserved to allow for support of the brown part between debinding and sintering, particularly if any handling of the brown part is required between the two processes. For instance, if the brown part is to be located adjacent to the support substrate following the debinding step.

Any suitable debinding process as is generally known in the art may be utilized in a composite formation process. The particular debinding process can generally depend on the polymeric binder of the green part. For instance solvent-, thermal-, or catalytic-debinding can be carried out. In one embodiment, a green part can be heated to a temperature at which the polymeric binder vaporizes. In another embodiment, the polymeric binder can be removed by dissolution or solvent extraction. Combinations of debinding processes can also be carried out. In general, most or all of the polymeric binder can be removed. However, some of the polymeric binder can remain in the brown part. For instance, a portion of the polymeric binder can remain and ensure that the brown part retains its shape and may be handled prior to sintering.

Solvent or catalytic debinding can begin with applying to the green part a debinding liquid. According to this embodiment, the polymeric binder can be chemically dissolved with the solvent and/or catalysts included in the debinding liquid. Solvent or catalytic debinding can occur at atmospheric pressure or under vacuum. Debinding solvents/catalysts can include, without limitation, water, nitric acid, and other organic solvents. However any suitable debinding liquid can be used with the present method and one of skill in the art is capable of choosing an appropriate debinding solution. The debinding liquid can be applied to the green part by spraying, placing in a bath, or any other suitable application method.

A thermal debinding process can be used, optionally in conjunction with a solvent or chemical debinding process. A thermal debinding process involves placing the green part into a heated unit, such as a furnace, where it is held at an elevated temperature for a period of time. The debinding temperature of a thermal debinding is high enough to remove polymeric binder within the green part and yet low enough to not exceed the melting point of the metal powder of the green part. Particular temperatures for a thermal debinding process can depend upon the specific materials included in the green part. It is well within the capabilities of those skilled in the art to determine a proper temperature and corresponding heating time to accomplish a thermal debinding process. By way of example, a thermal debinding process can include holding the green part in a furnace that is at an elevated temperature of from about 100° C. to about 500° C., or from about 110° C. to about 140° C. for a period of time from about 8 to about 48 hours. In one embodiment, a thermal debinding process can be carried out in stages, for instance a first stage at which the green part is held in a furnace that is heated and held at a temperature of about 200° C. for a period of about 30 minutes, a second stage in which the furnace is heated to a temperature of about 250° C. and held for a period of about 30 minutes, a third stage in which the furnace is heated to a temperature of about 300° C. and held for a period of about 30 minutes, and a final stage in which the furnace is heated to a temperature of about 500° C. and held for a period of about 120 minutes.

A thermal debinding process can be carried out under a vacuum. In one embodiment, a thermal debinding process can be carried out at a vacuum pressure of less than about 35 Torr, which can aid in the sublimation of the polymeric binder.

In one embodiment, a debinding process can include cleaning and drying the green part using densified fluids, for example, densified propane. An exemplary process can include pressurizing and heating a chamber containing the green part to transition the propane to its densified phase; displacing the binder species with the densified fluid; and depressurizing the chamber, which results in complete evaporation of the propane and formation of the brown part.

Prior to sintering (which can be either prior to or following debinding), the metal injection molded component can be placed in contact with a support substrate. More specifically, a surface of the metal injection molded component that includes a plurality of microstructures can be placed in contact with a surface of a support substrate such that the distal ends of the microstructures (i.e., the ends of the microstructures that are distal from the bulk of the metal injection molded component) contact the surface of the support substrate. The metal injection molded component can be brought into contact with the support substrate at any time during formation of the composition and prior to sintering. For instance, in one embodiment, in which a single furnace is used for both debinding and sintering, the metal injection molded component can be brought into contact with the support substrate prior to debinding of the green part.

The support substrate can be formed of any suitable material and to any desired shape. For instance, the support substrate can be a solid metal substrate. In one embodiment, the support substrate can be formed of the same metal as the metal of the injection molded component, but this is not a requirement, and the support substrate can be of a different material or a different grade of the same material.

Following debinding, and with the brown part adjacent to the support substrate such that the ends of the microstructures of the brown part are in contact with a surface of the support substrate, the brown part can be sintered. The sintering temperature can generally be greater than about 0.5 of the melting temperature of the metal powders of the metal injection molded component as measured in absolute degrees (Kelvin or Rankine scale). For instance, furnace temperatures during a sintering process can be up to about 1800° C., over a period of time of between about 5 hours and about 48 hours, as is known in the art. The sintering process can be carried out in several stages, including periods of time in which the furnace is held at a temperature below the ultimate sintering temperature of the process. Such stages can remove any remaining polymeric binder from the metal injection molded component.

Depending on the specific material, there can be a vacuum, an oxidizing, a reducing or an inert atmosphere in the sintering furnace as is generally known in the art. In addition, a force can be applied to the metal injection molded component and the support substrate to tightly hold the two pieces against one another prior to and/or during the sintering process. For instance, a force of from about 0.1 kg to about 1 kg or from about 1 kg to about 20 kg can be applied to the metal injection molded component and the support substrate prior to and/or during sintering.

Figure 3:
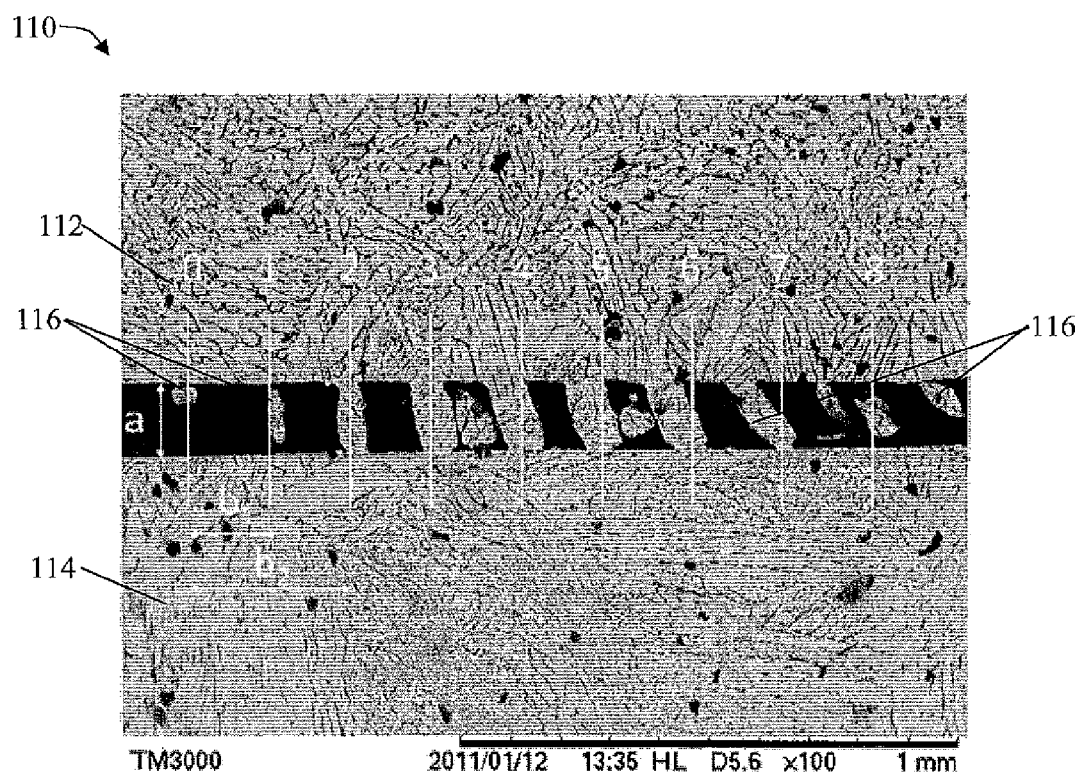
FIG. 3 is a cross sectional view of a bonding area between a metal injection molded component and a support substrate.

The formed composite can include the microstructures of the metal injection molded component bonded to the surface of the support substrate. As previously discussed, the microstructures provide for an amount of elasticity and allow for relative motion between the metal injection molded component and the support substrate. As such, microstructures of the final composite can be inclined from the initial angle of formation of the microstructures, due to relative motion during sintering and following bonding of the ends of microstructures to the support substrate. Moreover, the angle of inclination of each microstructure can vary as compared to other microstructures. For example, FIG. 3 illustrates a cross sectional view of a composite 110 following sinter bonding of a metal injection molded component 112 to a support substrate 114. As can be seen, the microstructures 116 are bonded to the support substrate 114, and are inclined, with the angle of inclination varying between individual microstructures. The inclination of the microstructures is understood to occur following bonding between the ends of the microstructures 116 and the surface of the support substrate 112 and prior to final densification and shrinkage of the metal injection molded component 112. The variation of inclination and deformation of the individual microstructures is believed to be due to a variation in the time of bonding between each microstructure 116 and the surface of the support substrate 114.

The bonding force between the metal injection molded component and the support substrate can be very strong. For instance, the shear stress over the total bonding area between the two components can be greater than about 150 MPa, greater than about 200 MPa, or greater than about 400 MPa. In general, the utilization of smaller diameter microstructures can provide a total bonding force between the metal injection molded component and the support substrate with a higher shear stress. While not wishing to be bound to any particular theory, this is believed to be due to an increase in total number of individual sinter bonds formed with the smaller microstructures due to the ability to form a larger number of microstructures over the bonding surface area.

A composite as described herein can be utilized in applications as are generally known for metal injection molded materials. For example, typical applications can include small parts for the automotive, medical, electronics or power tool industry.

By way of example, automotive applications can include an inlay for a valve seat in which a wear resistant metal injection molded valve inlay can be sinter bonded to a milled housing or a rocker arm in which the base is a stamped part and the inlay is a metal injection molded piece that is sinter bonded as described herein to the base part.

Medical applications can include composite implants such as orthodontic brackets. Disclosed methods can be utilized in forming pistons, for instance closed cavity pistons for use in hydrostatic power units as well as wear resistant inserts as may be incorporated into cutting tools.

The present disclosure may be better understood with reference to the Examples, set forth below.

Example 1

Several different molds were formed having different sizes of microstructures on a surface. A positive mold master was formed by use of photolithography, and molds were formed by casting a room temperature vulcanizing rubber compound over the positive mold masters. The molds formed included microstructures having physical characteristics as described in Table 1, below.

TABLE 1

| Sample | Cross Section | Diameter (μm) | Height (μm) | Pitch (μm) |
|---|---|---|---|---|
| 001 | circle | 10 | 25 | 20 |
| 002 | circle | 50 | 70 | 100 |
| 003 | circle | 100 | 170 | 200 |

Figure 4A:
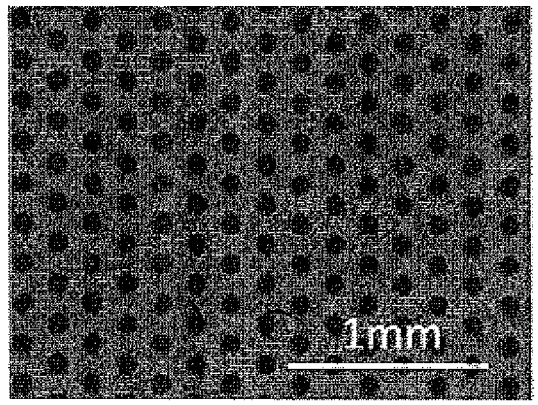
FIGS. 4A and 4B illustrate molds for use in forming a metal injection molded component including circular microstructures having a diameter of 100 μm (FIG. 4A) and 50 μm (FIG. 4B).
Figure 4B:
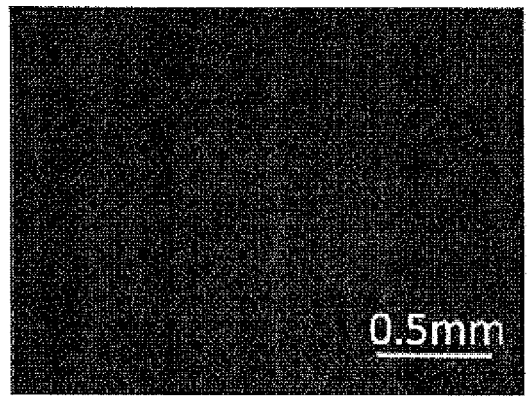

FIGS. 4A and 4B are images of the molds including 100 µm diameter microstructures (FIG. 4A) and 50 µm diameter microstructures (FIG. 4B). The 10 µm microstructures on the third mold were too small to capture by use of an optical microscope. The molded coupons each measured 25 mm×43 mm×2 mm.

Example 2

A commercially available metal injection molding feedstock was utilized to form the metal injection molded samples including microstructures on a surface. The feedstock used was BASF Catamold 17-4PH-A, which has a typical composition after sintering as shown below:
Carbon: ≤0.07%
Chromium: 15-17.5%
Nickel: 3-5%
Copper: 3-5%
Niobium: 0.15-0.45%
Manganese: ≤1%
Silicon: ≤1%
Iron: balance The metal injection molding feedstock was injected on a Milacron-Fanuc Roboshot injection molding machine.

Figure 5:
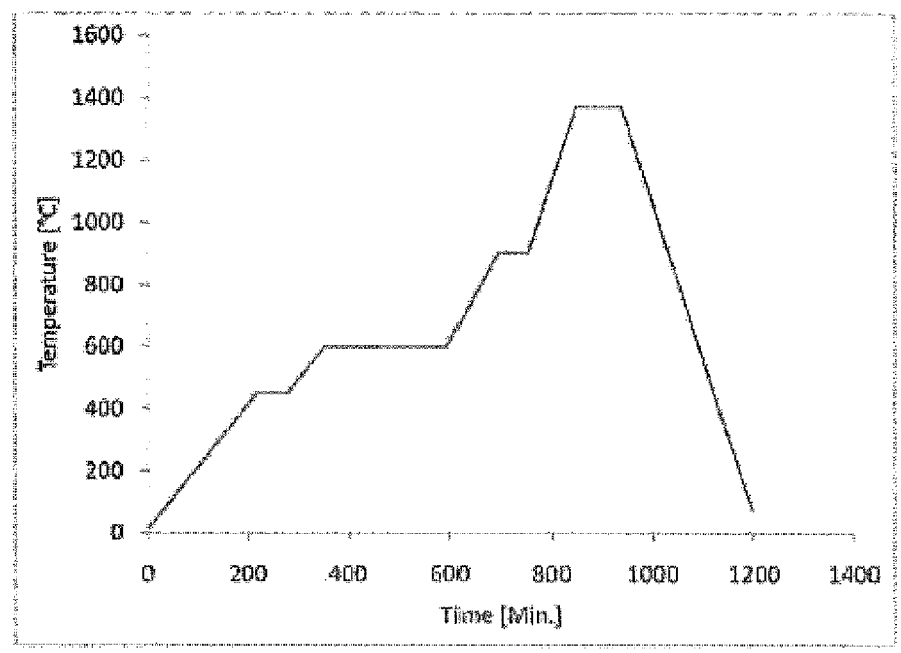
FIG. 5 graphically illustrates a sintering cycle used in formation of a composite as described herein.

Following debinding, the green parts were located on a substrate. The substrate was a 2 mm thick rolled 17-4PH coupon. The sintering cycle is illustrated in FIG. 5. As can be seen, during heat up to a final sintering temperature of 1400° C. there were several holds to assure complete burn off of the polymeric binder.

After cutting, polishing and etching the samples, the inclination of the microstructure were evaluated. For the evaluation, a completely bonded area was identified and 10 pillars were measured (FIG. 3, showing a section of sample 003, which includes 100 µm diameter structures). A first microstructure (0) being at 90° was taken to be the center of shrinkage of the evaluated area. Comparing the angles of the microstructures with the measured overall shrinkage of the part, 17.4%, there was a mismatch. The inclination was too small for the shrinkage. This indicated that the compact (i.e., the injection molded component) must have shrunken to a certain extend before the microstructures bonded to the substrate and then deformed while following the shrinkage until the final value.

While not wishing to be bound to any particular theory, it is understood that the microstructures 116 are not bonded to the substrate at the moment that the metal injection molded component 112 starts the sintering cycle. The component 112 begins to shrink with the microstructures 116 at the starting angle (90° in this example), and the microstructures 116 simply slide over the substrate 114 to follow shrinkage. At some point, a bond between each microstructure 116 and the substrate 114 is established. Following formation of this bond, the microstructures 116 begin to deform and the bulk of the metal injection molded component 112 can continue to shrink. If the microstructures 116 did not deform, either the bond would break or the metal injection molded component 112 would crack. The shrinkage is indicated by a decrease in the distances a, $b_1$, $b_2$ of the composite.

Example 3

Figure 6:
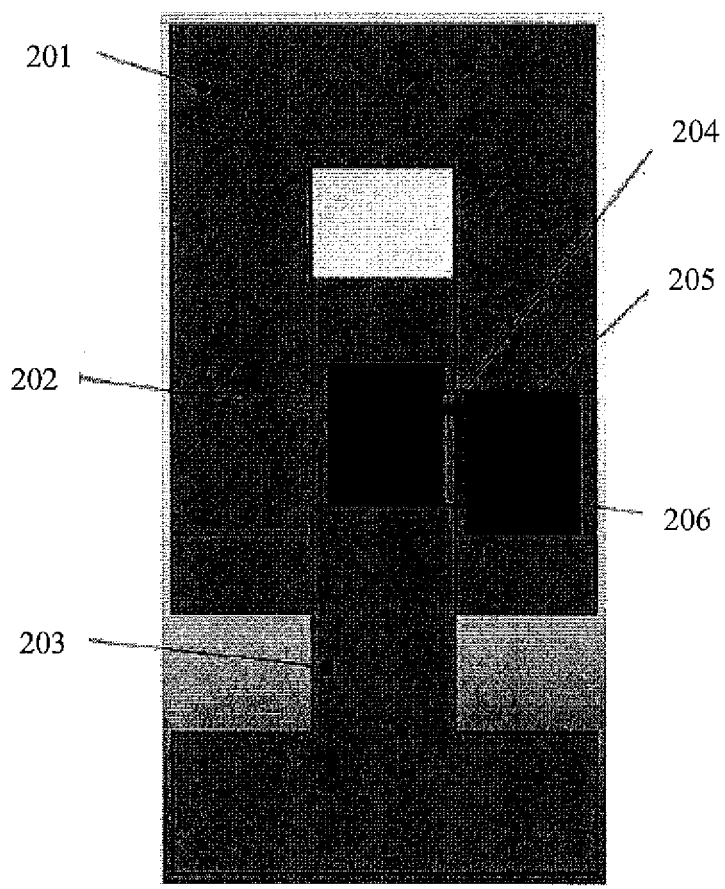
FIG. 6 is a schematic representation of a shear test unit used to determine the strength of sinter bonds formed on composites as described herein.

The strength of the bonding area covered by sinter bonds formed as described herein was determined by use of an Instron® tensile test machine. The shear testing unit is schematically illustrated in FIG. 6. The unit includes an upper yoke 201, a Lower T-shaped support 203, two inserts to hold the test part in place 202, 206, and a front and back plate (not visible). The test part including the support substrate 204 and the metal injection molded component 205 was fixed with its bonded surface in the shear plane. The device was calibrated to NIST standards.

During testing, the upper yolk 201 of the testing unit was pushed down while the T-shaped support 203 remained fixed. To evaluate bond strengths, a series of samples were prepared:
  3 samples of a metal injection molded composite formed as described above in Example 1, sample 001. (Samples 10_1, 10_2, 10_3)
  3 samples of a metal injection molded composite formed as described above in Example 1, sample 002. (Samples 50_1, 50_2, 50_3)
  2 samples of a metal injection molded composite formed as described above in Example 1, sample 003. (Samples 100_1, 100_2)
  Two coupons of rolled 17-4PH sheet joined with a 2-K adhesive bond. (Cold Weld)
  Two samples formed of two coupons of rolled 17-4PH sheet joined by brazing (Braze_1, Braze_2)
  Two coupons of rolled 17-4PH sheet joined by a resistance weld spot (Spot Weld)

All samples were cut to a dimension of 15 mm×15 mm. The bonding area of the samples including 10 µm diameter microstructures is reported as the entire area of overlap between the metal injection molded component and the support substrate, including the microstructure cross sectional area and the area between microstructures.

The bonding area of the samples including 50 µm diameter microstructures was determined by calculating the area of a square with corners at the center of four adjacent microstructures and dividing this area by the cross sectional area of one microstructure. This value was then multiplied by the entire bonding surface area of overlap between the metal injection molded component and the support substrate.

The bonding area of the samples including 100 µm diameter microstructures was determined by calculating the area of an isosceles triangle with corners at the center of three adjacent microstructures and dividing this area by the cross sectional area of one microstructure. This value was then multiplied by the entire bonding surface area of overlap between the metal injection molded component and the support substrate.

The force value is the measured force required to break the bond. The shear stress value was then determined from this measured value Results are shown in Table 2, below.

TABLE 2

| Sample | Shear Force (kN) | Bonding Area (mm²) | Shear Stress (MPa) | Average Shear Stress (MPa) |
|---|---|---|---|---|
| Braze_1 | 15.16 | 252.0 | 60.16 | |
| Braze_2 | 3.58 | 80.00 | 44.75 | |
| Spot Weld | 1.00 | 1.77 | 565.88 | |
| Cold Weld | 5.02 | 290.00 | 17.31 | |
| 10_1 | 25.56 | 48.00 | 532.50 | 452.84 |
| 10_2 | 24.41 | — | — | |
| 10_3 | 33.96 | 91.00 | — | |
| 50_1 | 22.93 | 80.00 | 286.63 | 242.16 |
| 50_2 | 23.50 | 77.00 | 305.19 | |
| 50_3 | 10.10 | 75.00 | 134.67 | |
| 100_1 | 9.53 | 54.00 | 176.48 | 183.52 |
| 100_2 | 10.29 | 54.00 | 190.56 | |

In evaluating the bonding surfaces following the testing, it was found that some of the microstructures were sheared off at the base, where the microstructures meet the metal injection molded component, and some of the microstructures were sheared off at the top, where the sinter bond was formed with the support substrate.

Overall, the bonding area including the sinter bonds showed a shear strength of up to about 80% of that of welded joints, and the strength of the braze joint and the adhesive bond was much lower.

Table 3, below, provides a summary of the shear test results for the metal injection molded composites. The ultimate tensile strength (UTS) of the 17-4PH feedstock used in forming the composites was 950 MPa and the ultimate shear strength (USS) of an alloy steel is generally considered to be 75% of the UTS. The percent of shear strength given in the table is the measured shear strength of the composite compared to the material's bulk USS. The feature to area ratio given in the table is the ratio of the bonding surface area obtained as described above to the total bonding surface area covered by the bond, i.e., the overlapping area of the metal injection molded component and the support substrate where the microstructures are contacting both components.

TABLE 3

| Microstructure height (μm) | UTS (MPa) | USS (MPa) | Measured shear strength (MPa) | % of USS | Feature to area ratio |
|---|---|---|---|---|---|
| 10 | 950 | 712.50 | 452.84 | 63.6 | n/a |
| 50 | 950 | 712.5 | 242.16 | 34.00 | 0.304 |
| 100 | 950 | 712.5 | 183.52 | 25.80 | 0.247 |

It will be appreciated that the foregoing examples, given for purposes of illustration, are not to be construed as limiting the scope of this disclosure. Although only a few exemplary embodiments have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims and all equivalents thereto. Further, it is recognized that many embodiments may be conceived that do not achieve all of the advantages of some embodiments, yet the absence of a particular advantage shall not be construed to necessarily mean that such an embodiment is outside the scope of the presently disclosed subject matter.

What is claimed is:

1. A metal injection molded composite comprising:
a metal injection molded component;
a support substrate; and
a plurality of microstructures spaced apart from one another, wherein each microstructure extends from the metal injection molded component and each microstructure includes a distal end that terminates in contact with the support substrate, the microstructures being extensions of the metal injection molded component and being sinter bonded to the support substrate such that the support substrate and the microstructures are directly bonded to one another.

2. The metal injection molded composite according to claim 1, wherein the metal injection molded component comprises steel.

3. The metal injection molded composite according to claim 1, wherein the support substrate is a solid metal substrate.

4. The metal injection molded composite according to claim 3, wherein the metal of the substrate is the same metal as the metal of the metal injection molded composite.

5. The metal injection molded composite according to claim 1, wherein at least a portion of the plurality of microstructures are inclined with respect to the surface of the support substrate.

6. The metal injection molded composite according to claim 5, wherein individual microstructures are inclined at different angles from one another with respect to the surface of the support substrate.

7. The metal injection molded composite according to claim 1, wherein the bonding force between the metal injection molded component and the support substrate has a shear stress of greater than about 150 Megapascals.

8. A method for forming the metal injection molded composite of claim 1 comprising:
metal injection molding a metal powder composition to form the metal injection molded component, the metal injection molded component comprising the plurality of microstructures on a surface;
locating the metal injection molded component adjacent to the support substrate such that the distal ends of the microstructures contact a surface of the support substrate; and
sintering the metal injection molded component, wherein sinter bonds are formed between the distal ends of the microstructures and the surface of the support substrate upon sintering.

9. The method according to claim 8, further comprising applying a force to the metal injection molded component and the support substrate to hold the two pieces against one another following locating the metal injection molded component adjacent to the support substrate.

10. The method according to claim 8, further comprising debinding the metal injection molded component.

11. The method according to claim 10, wherein the metal injection molded component is located adjacent to the support substrate following the debinding.

12. The method according to claim 10, wherein the debinding comprises thermal debinding.

13. The method according to claim 8, further comprising forming a mold defining the microstructures.

14. The method according to claim 8, further comprising forming the metal powder composition.

15. The method according to claim 8, wherein the sintering is carried out at a temperature that is greater than about 0.5 of the melting temperature of the metal powders as measured in absolute temperature.

16. The method according to claim 8, wherein the support substrate is a solid metal substrate.

17. The method according to claim 16, wherein the metal of the support substrate is the same metal as the metal of the metal powders.

18. The method according to claim 8, wherein the microstructures have an average diameter of between about 1 micrometer and about 1 millimeter.

19. The method according to claim 8, wherein the microstructures have an average height of between about 10 micrometers and about 1 millimeter.

20. The method according to claim 8, wherein the microstructures have a pitch of less than about 800 micrometers.

* * * * *